March 28, 1933.  W. S. GRAHAM  1,902,846
FLOW ATTACHMENT FOR TRACTORS
Filed Sept. 24, 1931  2 Sheets-Sheet 1
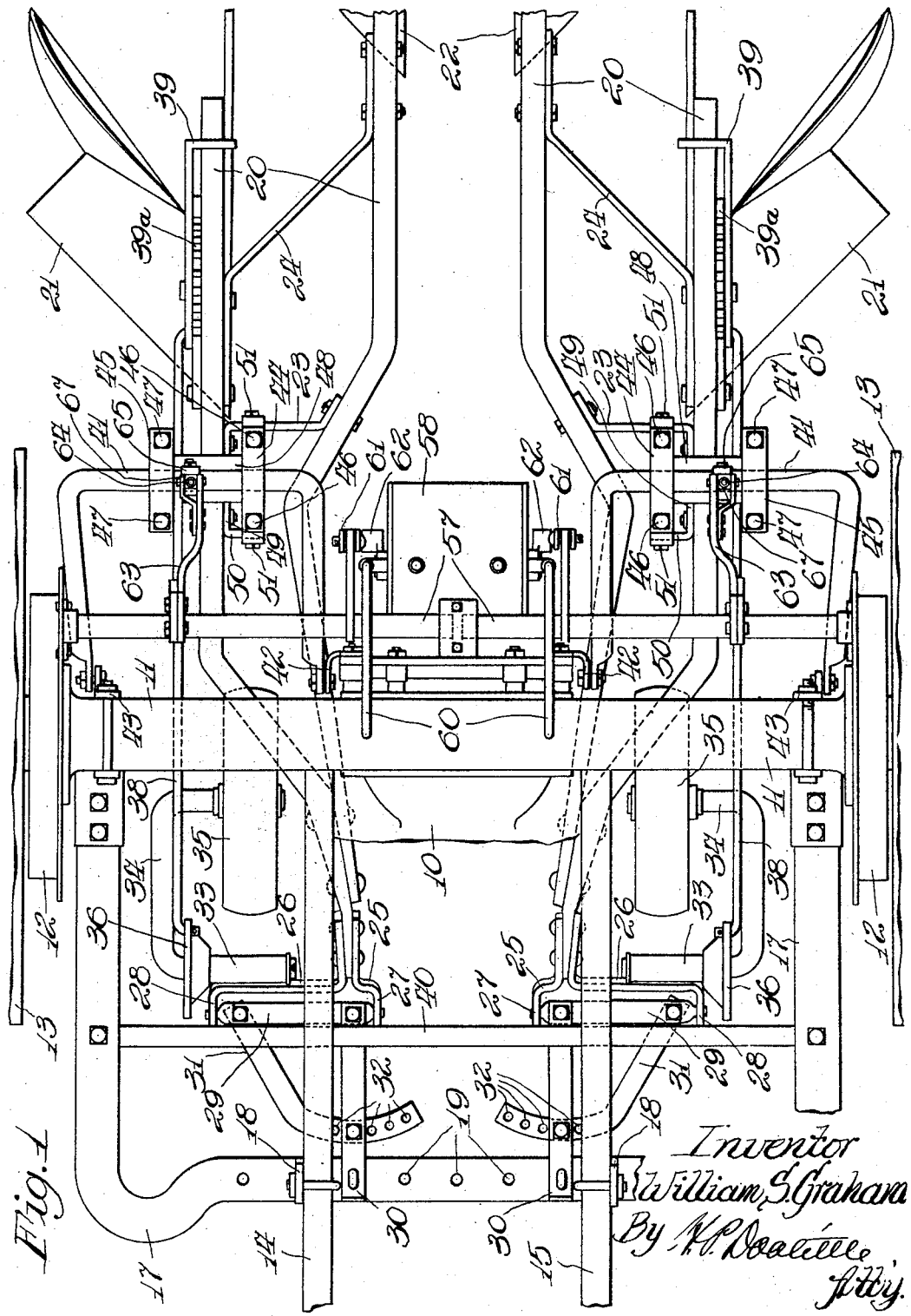

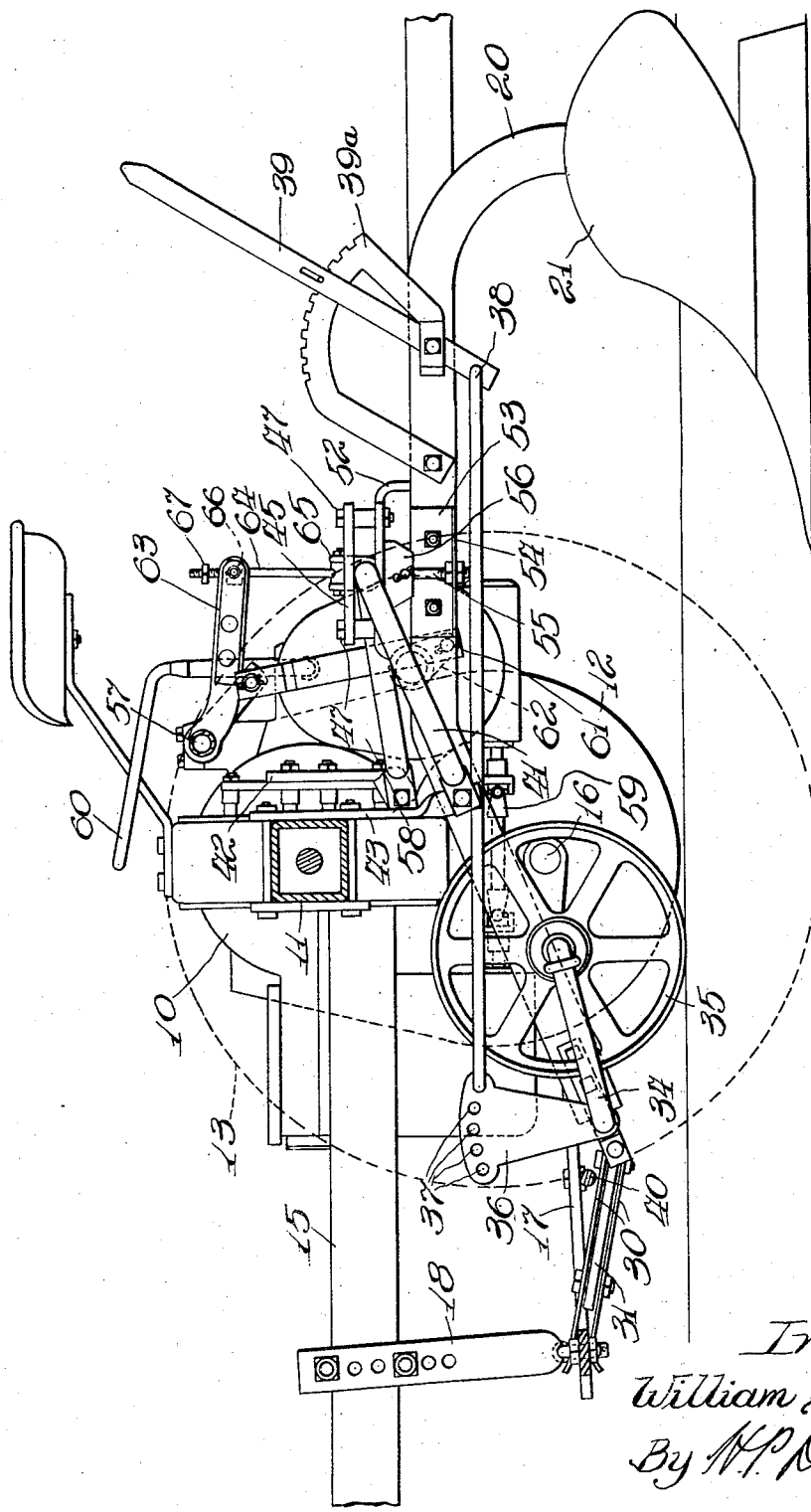

Patented Mar. 28, 1933

1,902,846

UNITED STATES PATENT OFFICE

WILLIAM S. GRAHAM, OF CANTON, ILLINOIS, ASSIGNOR TO INTERNATIONAL HARVESTER COMPANY, A CORPORATION OF NEW JERSEY

PLOW ATTACHMENT FOR TRACTORS

Application filed September 24, 1931. Serial No. 564,823.

The present invention relates to tractor carried plows and more particularly to structure for connecting a plow gang or gangs to a tractor.

The main objects of the invention are to provide a simplified, close coupled, type of connecting means for tractor gang plows; to provide for independent floating movement of the plow gang during operation; to provide for maintaining a constant depth of plowing unaffected by movements of the tractor over rough ground; and to provide for balance of the draft forces. More specifically, the object of the invention is to provide a two-way gang plow attachment having the advantages stated and permitting use of two two-bottom gang units in close coupled relation between the traction wheels of a so-called row crop tractor of the type having an upright, arched, rear axle structure on which lifting and lowering mechanism for the plows is located. Other minor objects and advantages will become apparent to those skilled in the art from the detailed description of the preferred embodiment of the invention which follows.

The invention accordingly resides in the combinations and details of construction hereinafter described and claimed and illustrated in the accompanying drawings, where:

Figure 1 is a plan view showing the rear end of a tractor with the plow gangs connected thereto; and, Figure 2 is a side view, with the axle housing of the tractor in section, showing the plowing attachment in position on the tractor with a plow gang in lowered or plowing position.

The invention is illustrated in combination with a tractor of the type having a wide tread rear axle, comprising an upright, arched, axle structure having a central enlargement or differential housing 10, from which extend lateral portions 11 constituting housings for the differential shafts. On the ends of the housings 11 there are secured depending housings 12 containing gears for driving the traction wheels 13 mounted on the outer faces of the depending housings. A central, forwardly extending, tractor body including side sill members 14 and 15 secured to the axle structure, comprises the usual engine and housings for the clutch and transmission, all of which are supported on the sills 14 and 15. Steering wheels (not shown) support the front end of the body. This briefly described tractor structure is well known.

At points directly below the transverse portion of the arched axle structure, the inner faces of the depending housings 12 are provided with inwardly extending pintles 16 (Figure 2) which serve as points or supports for a forwardly extending, substantially U-shaped, draft frame 17, the forward, transverse portion of which is supported on the side sills 14 and 15 by hanger bars 18 adjustably clamped to the respective sills. The transverse, or bight portion of the draft frame 17 is provided with a series of spaced holes 19, certain of which may receive and have suitably secured therein the reduced lower ends of the hanger bars 18, as shown in Figure 2. Certain of the other holes serve as hitch openings for the draft links of the plows which trail from the draft frame 17. In the present instance, two oppositely faced plowing units located at opposite sides of the central longitudinal line of the tractor, each containing two plow bottoms, are shown, and these are arranged to be alternately employed as usual with two-way plows. As the connecting elements and structures of the units at each side of the tractor are identical, it will only be necessary to describe one of them.

Each plowing unit, therefore, comprises a pair of plow beams having parallel, downwardly curved, rear portions 20, one of which extends rearwardly beyond the other and to which are secured the plow bottoms 21 and 22 in the usual offset relation. The two beams are rigidly secured together, as by cross-members 23 and 24, and the forward portions of the beams are shaped to converge towards each other and to incline towards the central longitudinal line of the tractor, as shown in Figure 1. The forward ends of the two beams are rigidly secured together and to clevis members 25 and 26, which present forwardly extending, parallel arms 27 and 28. The member 26 is laterally extended, while member 25 has its arm 27 only slightly offset from the point of connection to the plow unit. The two clevis members accordingly form a wide fork or yoke-like clevis having the plow unit secured thereto adjacent the inner arm of the fork. The arms 27 and 28 of the clevis are provided with openings in which are pivoted the ends of a cross-member 29. A pair of superposed straight draft links 30 (Figure 2) are pivotally connected to the inner end of the cross-member 29 and extend to the bight portion of draft frame 17, respectively contacting the opposite sides of this portion of the frame and being loosely secured thereto by a suitable coupling pin in one of the holes 19. The contacting ends of links 30 are preferably curved outwardly, as shown in Figure 2, to allow for some degree of vertical movement. The other, or outer end of the cross-member 29 has pivotally connected to it an angle setting bar 31, the forward end of which is curved, as shown in Figure 1, and received between the pair of draft links 30. The draft links at this point are provided with apertures registering with any one of a series of apertures 32 formed in the curved portion of the link 31, so that the links may be secured together at any desired point, thereby providing for horizontal angular adjustment of the cross-member 29 and, therefore, for proper alignment of the plow unit. The bars 29, 30 and 31 accordingly form a substantially triangular arrangement of relatively adjustable draft links having the plow unit pivotally connected at one end of the base of the triangularly disposed links. The laterally extended member 26 of the clevis has formed thereon or secured thereto a transverse bearing member or sleeve 33, in which there is journaled the forward end of a crank axle 34, the other end of which is bent inwardly to provide a spindle for a gage wheel 35 located adjacent the forward end of the plow unit and substantially midway between the parallel portions of the two plow beams. The forward transverse portion of the crank axle 34 has fixed thereon an upright arm or plate 36 provided with an arcuate series of holes 37 at its upper end for adjustable connection to a rearwardly extending rod 38 leading to the lower end of a hand lever 39 pivoted between its ends on the plow beam 20 and adapted to be locked on the usual rack 39ª secured to said beam. By movement of lever 39, the gage wheel 35 can be adjusted to vary the plowing depth and level the plows as may be required in conjunction with adjustment of the draft frame 17.

To limit upward swinging movement of the triangularly disposed links 29, 30 and 31, the draft frame 17 carries a transverse abutment, or stop bar 40, extending across the draft frame and positioned to be engaged by said links just forward of the axis of the pivotal connection to the clevis arms 27, 28. This serves to lower the hitch point and hold the plows against any tendency to ride out of the furrow, and also causes the plowing units to pivot on the clevis connection when being lifted, thus permitting a higher lift for the units without contact with the axle structure than if the pivot was higher and further forward on the drawbar 17.

As the preferred means for suspending the plow gang units at each side of the tractor and for lifting and lowering them, each side of the axle structure has mounted thereon a vertically swingable bail crank 41, extending rearwardly and having its arms pivotally connected to the lower ends of laterally spaced hanger bars 42 and 43, clamped to the transverse portion of the axle structure. The arms of the bail crank 41 are offset with respect to one another, as seen in Figure 2, and the pivot points on the hanger bars 42 and 43 are so positioned one above the other that the bight of the bail crank is disposed at an angle to the longitudinal transverse axis of the differential shaft housings. That is to say, the two bail cranks are disposed on lines diverging upwardly from the central longitudinal plane of the tractor to such a degree that, when a plowing unit is in lowered or working position, as in Figure 2, and the traction wheel at that side is in the furrow, the plowing unit including the plow bodies and the gage wheel will be in substantially vertical position while the tractor is tilted. Each bail 41 is located immediately above the beams of a plowing unit as shown on the drawings and the bight portion of the bail is rotatably connected with the outer beam 20 by a supporting bracket or saddle composed of two pairs of vertically spaced flat bars or straps 44 and 45 connected by spacer bolts 46 and 47. The bail is loosely seated between the straps and the two pairs of straps are spaced laterally so as to engage the mid-portion or bight of the bail at spaced points to resist lateral tilting of the plowing unit. A plate 48 connects the two pairs of straps beneath the bail, and the beam 20 extends under this plate and between the two pairs of straps. The plowing unit is suspended on the saddle by means of a bracket piece 49 secured to the inner, or land side of the beam 20 (Figure 1), said piece having parallel, outwardly extending ears 50 at the ends which are pivotally connected, as at 51, to similar depending ears 52 (Figure 2) formed on the lower strap of the pair 44 at that side. On the other side, the beam 20 has a bracket piece 53 secured to it formed with a horizontal flange 54. This flange has an opening to receive the threaded lower end of a bolt 55 bent at its upper end to provide an angular extension held in an opening in a flange 56 depending from the end of plate 48. Adjusting nuts on bolt 55 engage opposite sides of the flange 54 and adjustment of these nuts will cause the plowing unit to be tilted on the pivot at 51 on the opposite side of the beam. The construction just described provides for lateral tilting adjustment of the plowing unit and for holding it at the desired adjustment.

The lifting mechanism for the plowing units may comprise a two part rockshaft 57 suitably journaled in bearings secured to the upper rear portions of the axle structure. Each lateral half of the rockshaft can be separately oscillated through a double power lift mechanism contained in a casing 58 secured to the differential housing of the axle structure and driven by a power shaft 59 connected to the tractor transmission. The double lift mechanism is controlled by trip levers 60 at each side. The lift mechanism here described forms the subject-matter of assignee's copending application Serial No. 540,142, filed May 26, 1931.

Each section of the rockshaft 57 is connected by means of a crank arm and link 61 to a crank 62 of the power lift device, and each section of shaft 57 has a rigid lifting arm 63 extending over one bail crank 41 and connected to it by a lift, or pick-up, line 64 pivoted to a yoke 65 loosely embracing the bight portion of the bail between the saddle straps 44, 45, and which has its upper end freely slidable through a pivoted collar 66 on the end of the lift arm 63.

The arrangement is such that, when the plowing unit is in the lowered position of Figure 2, the collar 66 will have traveled down the rod a sufficient distance from a stop nut 67 on the upper end of the link 64 to allow the plowing unit to have vertical floating movement without interference from the lift connection.

The general organization herein disclosed, whereby the plowing units are mounted on a tractor of the type described in close coupled relation thereto and in such manner as to have independent floating movement, forms the subject-matter of assignee's copending application Serial No. 558,034 filed August 19, 1931. The novel features in which the present invention resides are in the manner of coupling the gang plow units to a drawbar located forwardly of the axle structure, so as to secure a low hitch point, substantially direct lines of draft for both units of a two-way gang plow, free movement of each unit laterally and over uneven ground surface, and high lift about a pivot point back of the primary hitch point but forward of the axle. The structure above described has the advantages stated and represents a preferred embodiment of the invention, which structure may, however, be varied without departure from the invention as defined in the following claims.

What is claimed is:

1. The combination with a tractor of a horizontal drawbar carried thereby having a transversely extending portion, a draft element comprising a link having its forward end connected to the transverse portion of the drawbar for movement laterally and vertically and a transverse link pivotally connected to its rear end, a plow beam pivoted on a horizontal axis at its forward end to said transverse link, means carried by the draft element for adjusting the angular relation of said links, a transversely extending stop bar on the drawbar positioned to prevent upward movement of the draft element into the horizontal plane of the drawbar, and a ground engaging support on the forward end of the plow beam.

2. The combination with a tractor of a horizontal drawbar carried thereby having a transversely extending portion, a draft element comprising angularly arranged links adjustably pivoted together for varying the angular relation thereof, one of which is pivoted at its forward end on the transverse portion of the drawbar for movement vertically and laterally and another extending transversely, a plow beam pivoted on a horizontal axis to the transversely extending link and positioned at one end thereof, a vertically adjustable gage wheel mounted on the forward end of the plow beam and located between said beam and the other end of said transverse link, and a stop bar carried on the draw bar back of and in parallel relation to the transverse portion thereof and positioned to engage the upper side of the draft element and limit upward movement thereof.

3. The combination with a tractor comprising an upright arched rear axle structure, of a forwardly extending U-shaped draft frame having its arms connected to the side portions of the arched axle, means for suspending the forward end of said draft frame on the tractor body in substantially horizontal position, a stop-bar extending across the draft frame near its forward end, a draft element pivoted on the transverse portion of the draft frame and extending rearwardly below the stop-bar and in position to contact therewith, a plow beam extending under the axle and having a transverse pivotal connection with said draft element adjacent the stop-bar, a gage wheel mounted on the front end of the plow beam adjacent said transverse pivotal connection, and means on the axle structure for lifting and lowering the plow beam whereby the beam will pivot on its transverse pivotal connection to the draft element.

4. The combination with a tractor comprising an upright arched rear axle structure, of a forwardly extending U-shaped draft frame having its arms connected to the side portions of the arched axle, means for suspending the forward end of said draft frame on the tractor body in substantially horizontal position, draft elements loosely connected to the transverse member of the U-shaped frame at each side of the longitudinal middle line of the tractor, each comprising angularly related members located forwardly of the axle structure, one of which extends laterally from the other and away from said middle line, plowing units each having a forward beam end located at the inner end of a laterally extending member and pivoted thereon, said units diverging rearwardly from the middle line of the tractor and terminating as parallel spaced plow carrying members, an adjustable gage wheel mounted on each forward beam end and located within the space between said beam end and the end of the laterally extending member of the draft element and on a line passing between said plow carrying members, a transverse stop bar connecting the arms of the draft frame and located above the draft elements to limit upward movement thereof, and means on the axle structure for raising and lowering either plowing unit on its pivotal connection to the draft element.

5. In a plowing attachment for tractors, the combination of a horizontal drawbar, a vertically swingable draft element connected to said drawbar, means on the drawbar for limiting movement of the draft element to an arc below the horizontal plane of the drawbar, a plow beam connected to said draft element, means for adjusting the beam angularly on the draft element about a vertical axis, and a ground engaging support adjacent the forward end of said beam normally holding the draft element in engagement with said movement limiting means.

6. The combination with a tractor comprising a rear axle housing and traction means, of a drawbar having a transversely extending horizontal portion located forward of the rear axle housing, a plow including a beam extending under the axle housing, draft elements between the transverse portion of the drawbar and the forward end of the plow comprising a link pivoted on the drawbar and a cross piece pivoted to the rear end of said link on a vertical axis, a pivotal connection between the ends of the cross piece and the forward end of the plow beam, means for angularly adjusting the cross piece on its pivotal connection to the link, and a gauge wheel supporting the forward end of the plow beam adjacent its pivotal connection to the cross piece.

In testimony whereof I affix my signature.

WILLIAM S. GRAHAM.